Oct. 7, 1969    W. FARNWORTH    3,471,203
PARTICULATE MATERIAL PUMPING APPARATUS
Filed Jan. 30, 1967

INVENTOR
WILFRED FARNWORTH
BY
Fetherstonhaugh & Co.
ATTORNEYS

United States Patent Office 3,471,203
Patented Oct. 7, 1969

3,471,203
PARTICULATE MATERIAL PUMPING
APPARATUS
Wilfred Farnworth, North Vancouver, British Columbia,
Canada, assignor to Rader Pneumatics & Engineering
Co. Ltd., Burnaby, British Columbia, Canada
Filed Jan. 30, 1967, Ser. No. 612,704
Int. Cl. B65g 53/30, 53/40
U.S. Cl. 302—14                           22 Claims

ABSTRACT OF THE DISCLOSURE

This apparatus can be used for pumping particulate material, such as wood chips, sawdust, grain, powder, and the like, into fluid conveyor lines or systems, or for removing particulate material from such lines or systems and directing it to a desired point. A piston moves particulate material from an inlet of a cylinder to an outlet thereof, while helping to prevent fluid from getting into or out of said lines or systems. Either the inlet or outlet is connected to the conveyor line or system so as to be in communication with the interior thereof. A fluid, such as air or water, is directed between the cylinder and piston walls during movement of the piston to prevent particulate material from getting between these walls.

BACKGROUND OF THE INVENTION

This invention relates to pumping apparatus for particulate material, and particularly to apparatus for pumping particulate material into fluid conveyor systems, or for pumping to remove particulate material from such systems, in either case without loss of conveying fluid. The fluid of these systems may be maintained above or below atmospheric pressure.

In the past, the greatest difficulties to be overcome in the use of pumps for injecting particulate materials into fluid conveyor systems, or the removal of these materials from the systems, has been the severe wear which occurs owing to ingress of the particulate material into the working clearances, and the serious loss of fluid, usually air, which occurs because of the excessive clearances which facilitate operation, and/or because the pump is one which works on the principle of a gate-lock device, i.e., an isolated compartment is filled with particulate material and then positioned so that it can discharge into the fluid conveying system. After discharging its load, the compartment returns to its initial position filled with the fluid of the system, and this fluid is then displaced by the incoming material, and by expansion in the case of gases. One example of this is the star-feeder or rotary air-lock which is commonly used to feed particulate material into or to remove materials from pneumatic and hydraulic conveying systems.

A solids pump which is in common use is the screw type which relies on compaction of the particulate material in part of the unit to form a seal capable of withstanding the opposing fluid pressure. This type of pump requires comparatively large horsepowers, and a great proportion of the power is lost in friction. This type of pump is also subject to a high rate of wear with the resulting high maintenance costs.

SUMMARY OF THE INVENTION

Pumping apparatus according to the present invention includes a piston operating in a cylinder for shifting particulate material which is directed thereinto through an inlet opening, longitudinally of the cylinder, and out through an outlet opening. As the piston approaches the outlet opening, it closes the inlet opening, and then a valve which normally closes the outlet opening is opened to permit the particulate material to move out of the cylinder through said opening. When the piston reaches the outlet opening, this valve is closed and remains so until the piston is retracted sufficiently to permit particulate material again to flow into the cylinder. Means is provided for directing fluid between the adjacent walls of the piston and cylinder during movement of the piston in order to keep particulate material from between these walls and to lubricate said walls. This makes it possible to have sufficient clearance between the piston and cylinder walls for easy movement of the piston without the danger of the particulate material lodging between these walls to cause excessive wear. This keeps the amount of power required for moving the piston down to a minimum.

In the preferred form of the invention, one of said openings is connected to a fluid conveyor system, in which case, the fluid directed between the cylinder and piston walls is the same as that used in the system. With this arrangement, there is practically no loss of the conveying fluid since, when the piston is retracted, said valve is closed and therefore the conveying fluid cannot escape through the cylinder. This valve remains closed until the piston closes the inlet opening so that conveying fluid cannot escape through the cylinder when the valve is opened. Contamination of the fluid in the conveyor system is prevented by directing the same fluid into the space between the cylinder and piston walls. In one embodiment of the invention, the wall of the piston is porous, and the cleansing and lubricating fluid is directed into the piston and through the wall thereof into the space between the latter and the cylinder wall. This has the advantage that as the piston moves along the inlet opening towards the outlet opening, this fluid tends to fluidize the particulate material at said inlet opening to cause it to flow freely into the cylinder and to prevent bridging or sticking at said inlet opening. In another embodiment of the invention, the wall of the cylinder is porous, and the cleansing and lubricating fluid is directed through this wall. This arrangement has the advantage that this fluid is directed into the particulate material as it is moved through the cylinder from the inlet opening to the outlet opening, in which case, the material is fluidized and flows easier than would otherwise be the case, thus helping to reduce the amount of power required and the wear on the cylinder walls.

DESCRIPTION OF THE PREFERRED EMBODIMENTS

Figure 1:
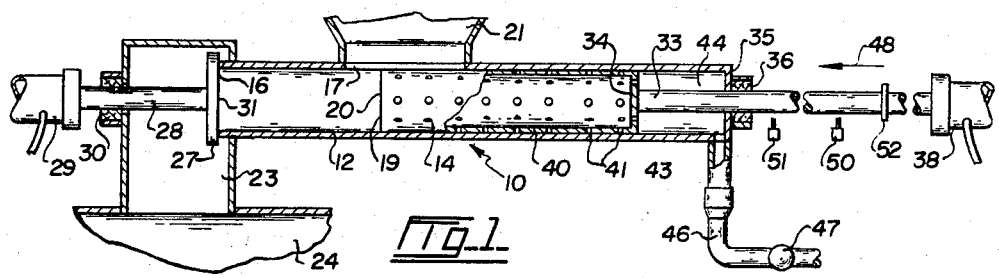
FIGURE 1 is a longitudinal section through one embodiment of the invention with the outlet opening thereof connected to a fluid conveyor system, showing the piston partially closing the inlet opening.
Figures 2, 3:
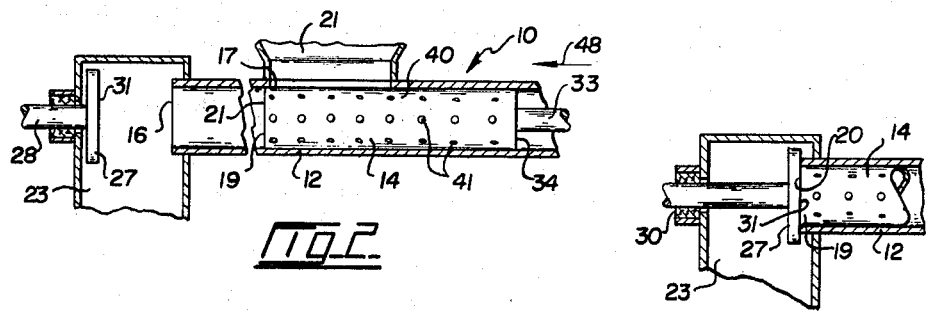
FIGURE 2 is a fragmentary view similar to FIGURE 1, showing the piston moving towards the outlet opening.
FIGURE 3 is a fragmentary view similar to FIGURE 1, showing the piston at the end of its pumping stroke with the valve closed.

Referring to FIGURES 1 to 3 of the drawings, 10 is particulate pumping apparatus according to the present invention including an elongated cylinder member 12 having a piston member 14 slidably mounted therein for movement longitudinally thereof. This cylinder has an outlet opening 16 at one end thereof, and an inlet opening 17 formed in the wall of the cylinder spaced axially thereof from the outlet opening. Although outlet 16 can be formed in the wall of the cylinder, it is preferably positioned in the end thereof, as shown, and is large enough for the end 19 of piston 14 to fit into. The piston end 19 preferably has a flat outer surface 20 extending substantially normal to the longitudinal axis of the piston and cylinder. In this example, a hopper 21 is mounted above cylinder 12 and positioned to discharge into and through inlet opening 17, while outlet opening 16 opens into a closed duct 23 which extends downwardly from the cylinder and opens into part of a fluid conveyor system, such as a line 24 thereof. The fluid in the conveyor system is usually gas, such as air, but it can be fluid, such as water. If the fluid is gas, it may be maintained at a pressure above or below atmospheric pressure, in which case it is either a pressure or a vacuum conveyor system.

A valve 27 normally is retained in a position closing outlet 16, said valve being opened and closed in any convenient manner. In this example, the valve is mounted on the end of a ram 28 which projects from a fluid-operated cylinder 29. As the controls for extending and retracting ram 28 by cylinder 29 are well known in the art, they do not require any description herein. Ram 28 extends across duct 23 and through a wall thereof and, preferably, through a fluid seal 30. Valve 27 preferably has a flat surface 31 opposed to piston end surface 20 and extending normal to the longitudinal axis of cylinder 12.

Piston 14 is reciprocated in any convenient manner. In this example, a piston rod 33 is connected to the end 34 of the piston and extends through cylinder end wall 35 and a fluid seal 36 to a fluid-operated cylinder 38. The well-known controls for cylinders of this type are not shown.

The cylindrical wall 40 of piston 14 is porous, as for example, by being formed with perforations 41 throughout the length thereof and around the cylinder. Fluid is directed into cylinder 14 in any convenient manner. If the fluid of system 24 is liquid, liquid is directed into the cylinder, but if the conveying fluid is air, then air is directed into said cylinder. In this example, the end 34 of the piston has one or more apertures 43 therein so that the interior of the cylinder communicates with the portion 44 of cylinder 12 between the piston and cylinder end 35. Fluid is directed into said cylinder portion 44 by a suitable pipe 46, said pipe opening into the cylinder near end wall 35 thereof. This fluid can be continuously directed into the cylinder, or a valve 47 in pipe 46 may be operated in any convenient manner to permit fluid to flow into the cylinder only when the piston is moving, or at predetermined intervals, at which time particles will be flushed from between the piston and cylinder.

FIGURE 1 shows piston 14 moving towards the outlet 16 of cylinder 12, see arrow 48. Particulate material is flowing into the cylinder through inlet opening 17, and valve 27 is closing outlet 16. When the piston completely closes inlet opening 17, as shown in FIGURE 2, valve 27 is moved to open outlet 16. As the piston continues to move, it moves the particulate material through the cylinder and out through outlet 16 into and through duct 23 into conveyor system 24. The piston is long enough to keep the inlet opening closed at this time so that conveyor fluid of the line or system cannot escape from the apparatus. As soon as the end 19 of the piston enters outlet 16 to close the latter, valve 27 is moved back to its normal position also closing said outlet. As this is done with the piston end in the outlet, at which time the flat piston end and valve surfaces 20 and 31 are together, see FIGURE 3, no residual fluid is left in the cylinder at this time. Piston 14 is then retracted until inlet opening 17 is completely open, and the cycle is repeated.

The timing of the opening and closing of valve 27 may be accomplished in any convenient manner. For example, spaced apart switches 50 and 51 may be provided adjacent piston rod 33 outside cylinder 12, and a switch operating finger 52 mounted on the piston rod. The moment piston 14 completely closes inlet 17, finger 52 operates switch 50 which is electrically connected to control mechanism for causing cylinder 29 to open valve 27. When end 19 of the piston closes outlet 16, finger 52 operates switch 51 to cause cylinder 29 to close valve 27.

During operation of piston 14, fluid is directed to pipe 46 into cylinder 12 and through apertures 43 into the piston. This fluid passes out of the piston through perforations 41 between wall 40 thereof and the cylinder wall to keep these adjacent walls lubricated, and to prevent particulate material from lodging between these walls to cause abrasion thereof. This fluid, being the same as the conveying fluid in line or system 24, will not contaminate the latter fluid. As the piston moves across inlet 17 during travel in either direction longitudinally of cylinder 12, the fluid passing out of the piston through perforations 41 tends to fluidize the particulate material in said inlet and at the bottom of hopper 21 so that the particulate material flows freely into cylinder 12 and will not bridge or clog in the inlet.

Figure 4:
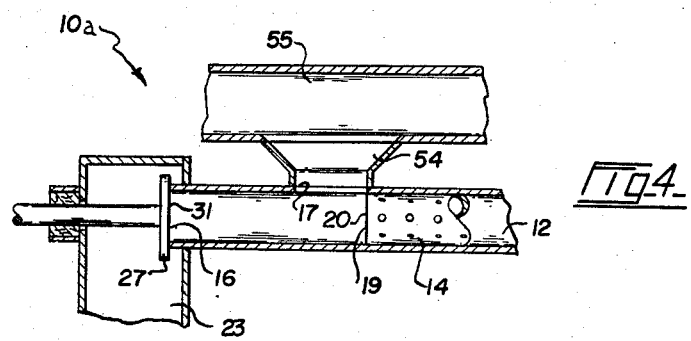
FIGURE 4 is a fragmentary sectional view of a slight variation of FIGURE 1, with the inlet opening connected to a fluid conveying line.

FIGURE 4 illustrates pumping apparatus 10a which is the same as apparatus 10, excepting that hopper 21 is replaced by a duct 54 which extends from cylinder 12 at inlet opening 17 thereof to a fluid conveyor line or system 55 which opens into said duct. The lower end of the duct communicates with the interior of cylinder 12 through inlet 17. In this example, duct 23 discharges into a suitable container or on to a conveyor, not shown.

The operation of apparatus 10a is the same as that of apparatus 10, the only difference being that the latter pumps particulate material into conveyor system 24, whereas apparatus 10a receives particulate material from conveyor system 55. When valve 27 is closed, it prevents conveyor fluid from escaping from the conveyor system through the pumping apparatus, and when piston 14 closes inlet opening 17, it does the same thing.

Figure 5:
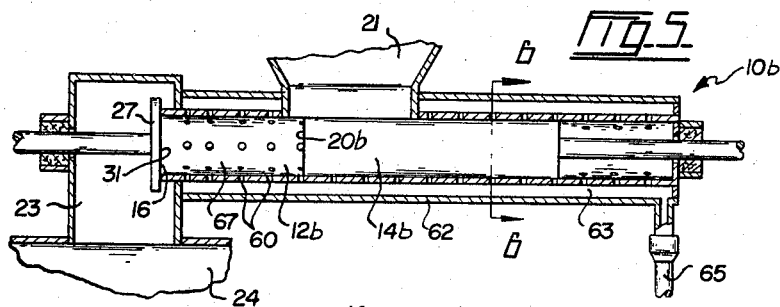
FIGURE 5 is a longitudinal sectional view through an alternative embodiment of the invention with the outlet opening connected to a fluid conveyor system.
Figure 6:
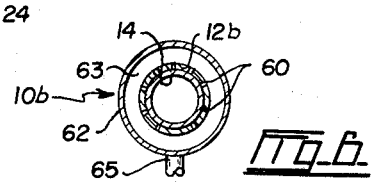
FIGURE 6 is a section taken on the line 6—6 of FIGURE 5.

FIGURES 5 and 6 illustrate apparatus 10b which is an alternative embodiment of the invention. Apparatus 10b is the same as apparatus 10, excepting that the cleaning and lubricating fluid is not directed through the piston wall into the cylinder, but is directed through the cylinder wall between the latter and the piston wall. In this embodiment, the wall of cylinder 12b is porous, as for example, by being formed with perforations 60 therein throughout the length thereof. A cylinder or sleeve 62 surrounds and encloses cylinder 12b to form an annular chamber 63 therebetween. A pipe 65 directs fluid, preferably the same fluid as in conveyor system 24, into chamber 63, and this fluid passes through perforations 60 into the clearance space between the wall of cylinder 12b and the wall of piston 14b, which is not perforated.

The pumping action of apparatus 10b is exactly the same as that of apparatus 10, but the lubricating and cleansing fluid is directed between the cylinder and chamber walls through perforations 60 of the cylinder wall during reciprocation of piston 14b. This fluid lubricates and keeps particulate material from between these adjacent walls. As piston 14b moves towards outlet openings 16 and when valve 27 is open, the fluid entering the portion 67 of the cylinder fluidizes the particulate material therein to help the movement thereof into and through outlet 16.

While duct 23 of apparatus 10b is shown as being connected to conveyor system 24, it is obvious that this duct may discharge into a suitable container or on to a conveyor, and hopper 21 may act as a duct, in which case, it would be connected to a fluid conveyor system, such as system 55 of FIGURE 4.

Having illustrated and described certain preferred embodiments of the present invention it is to be understood that the invention permits of modification in arrangement and detail. I claim all such arrangements and modifications as come within the scope of the appended claims.

I claim:

1. Particulate material pumping apparatus comprising an elongated cylinder member having an outlet near an end thereof and an inlet spaced axially of the cylinder member from the outlet and through which particulate material can pass into the cylinder member, an elongated piston member slidably fitting in the cylinder member, said piston member being long enough completely to close said inlet when an end of the piston member is at and closing the outlet, said piston member being retractable to permit particulate material to enter the cylinder through the inlet, a valve positioned for opening and closing said outlet, the wall of said piston member being perforated, and means for directing fluid into said piston member and between adjacent walls of said members during reciprocation of the piston member to keep particulate material from between and to lubricate said adjacent walls.

2. Pumping apparatus as claimed in claim 1 wherein the said piston member is tubular and porous in the side wall thereof and said directing means is adapted to direct fluid into said piston so that fluid will flow outwardly through said porous walls.

3. Pumping apparatus as claimed in claim 1 in which said end of the piston member and said valve have flat surfaces that bear against each other when the piston member and valve are closing said outlet.

4. Pumping apparatus as claimed in claim 1 in which the cylinder member is long enough to accommodate the piston member when the latter is retracted fully to open said inlet, the end of the cylinder member remote from the outlet end thereof being closed, and said directing means comprises pipe means for directing fluid into said closed end of the cylinder, the adjacent end of the piston member having opening means therein through which fluid flows into said piston member.

5. Pumping apparatus as claimed in claim 18 including valve means in said pipe means for controlling the flow of fluid into the cylinder member.

6. Particulate material pumping apparatus comprising an elongated cylinder member having an outlet opening near an end thereof and an inlet opening spaced axially of the cylinder from the outlet opening and through which particulate material can pass into the cylinder member, means connecting one of said openings to a fluid conveyor system so that said one opening is in communication with the interior of said system, an elongated piston member slidably fitting in the cylinder member and long enough completely and simultaneously to close the outlet and inlet openings, means connected to the piston member to reciprocate the latter member in the cylinder member between a first position wherein said outlet and inlet openings are closed and a second position wherein said inlet and outlet openings are opened so as in the latter position to permit particulate material to enter the cylinder through the inlet opening, a valve movable to positions opening and closing said outlet opening, means connected to the valve operable to open said valve when the piston member closes the inlet opening during movement of the piston member towards the outlet opening and to close the valve when the piston member closes said outlet opening, said wall of said piston member being perforated, and means for directing fluid into said piston member and between adjacent walls of said members during reciprocation of the piston member to keep particulate material from between and to lubricate said adjacent walls.

7. Pumping apparatus as claimed in claim 6 in which said end of the piston member and said valve have flat surfaces that bear against each other when the piston member and valve are closing said outlet opening.

8. Pumping apparatus as claimed in claim 6 in which the cylinder member is long enough to accommodate the piston member when the latter have moved fully to open said inlet opening, the end of the cylinder member remote from the outlet opening end thereof being closed, and said directing means comprises pipe means for directing fluid into said closed end of the cylinder, the adjacent end of the piston member having opening means therein through which fluid flows into said piston member.

9. Pumping apparatus as claimed in claim 6 in which the cylinder member is long enough to accommodate the piston member when the latter have moved fully to open said inlet opening, and said directing means comprises a closed cylinder enclosing said elongated cylinder member to form a chamber therebetween, and pipe means for directing fluid into said chamber.

10. Particulate material pumping apparatus comprising an elongated cylinder, an elongated piston slidably and reciprocally mounted in the cylinder and having a closed end, said cylinder being completely open at one end to form an outlet opening into which said closed end of the piston can move to close said outlet opening, said cylinder having an inlet opening therein axially spaced from the outlet opening and through which particulate material can pass into the cylinder, said piston being long enough completely and simultaneously to close outlet and inlet openings and being retractable to clear its closed end of the inlet opening to permit particulate material to enter the cylinder through said inlet opening, a valve movable to a first position opening the outlet opening and to a second position closing said outlet opening, said valve when in the second position engaging the piston end when the latter is in the outlet opening, and means for directing fluid between adjacent walls of the piston and cylinder during reciprocation of the piston to keep particulate material from between and to lubricate said adjacent walls.

11. Pumping apparatus as claimed in claim 10 in which said wall of the piston member is porous, and said directing means is adapted to direct fluid into the piston member.

12. Pumping apparatus as claimed in claim 10 in which said wall of the cylinder member is porous, and said directing means is connected to the cylinder member.

13. Pumping apparatus as claimed in claim 10 in which the cylinder member is long enough to accommodate the piston member when the latter is retracted fully to open said inlet, and said directing means comprises a closed cylinder enclosing said elongated cylinder member to form a chamber therebetween, and pipe means for directing fluid into said chamber.

14. Pumping apparatus as claimed in claim 13 including valve means in said pipe means for controlling the flow of fluid into said chamber.

15. Pumping apparatus as claimed in claim 10 including means connecting one of said openings to a fluid conveyor system so that said one opening is in communication with the interior of said system, and said directed fluid is the same as that of said conveyor system.

16. Pumping apparatus as claimed in claim 15 including means connected to the piston to reciprocate the latter between positions closing the outlet opening and opening said inlet opening, and means connected to the valve operable to open said valve when the piston closes the inlet opening during movement towards the outlet opening and to close the valve when the piston closes said outlet opening.

17. Particulate material pumping apparatus comprising an elongated cylinder, an elongated piston slidably and reciprocally mounted in the cylinder and having a closed end, said cylinder having an outlet opening in an end thereof into which said closed end of the piston can move to close said outlet opening, said cylinder having an inlet opening therein axially spaced from the outlet opening and through which particulate material can pass into the cylinder, said piston being long enough completely and simultaneously to close said outlet and inlet openings and being retractable to clear its closed end of the inlet opening to permit particulate material to enter the cylinder through said inlet opening, a valve movable to positions opening and closing said outlet opening, means for directing fluid between adjacent walls of the piston and cylinder during reciprocation of the piston to keep particulate material from between and to lubricate said adjacent walls, means connecting one of said openings to a fluid conveyor system so that said one opening is in communication with the interior of said system, and said directed fluid is the same as that of said conveyor system, means connected to the piston to reciprocate the latter between positions closing the outlet opening and opening said inlet opening, and means connected to the valve operable to open said valve when the piston closes the inlet opening during movement towards the outlet opening and to close the valve when the piston closes said outlet opening, said fluid directing means comprising pipe means connected to the end of the cylinder remote from the outlet end thereof for directing fluid into said remote end, said remote end being closed and said piston being tubular and the wall thereof being perforated and said piston opening into the closed cylinder end.

18. Pumping apparatus as claimed in claim 16 in which said fluid directing means comprises pipe means connected to the end of the cylinder remote from the outlet end thereof for directing fluid into said remote end, said remote end being closed and said piston being tubular and the wall thereof being porous and said piston opening into the closed cylinder end.

19. Pumping apparatus as claimed in claim 16 in which said fluid directing means comprises a closed outer cylinder enclosing said elongated cylinder to form a chamber therebetween, said wall of the elongated cylinder being porous, and pipe means connected to said chamber for directing fluid thereinto.

20. Particulate material pumping apparatus comprising an elongated cylinder member having an outlet near an end thereof and an inlet spaced axially of the cylinder member from the outlet and through which particulate material can pass into the cylinder member, an elongated piston member slidably fitting in the cylinder member, said cylinder and piston members having adjacent walls, said piston member being long enough completely to close said inlet when an end of the piston member is at and closing the outlet, said piston member being retractable to permit particulate material to enter the cylinder through the inlet, a valve positioned for opening and closing said outlet, said wall of one of said members having perforations therein substantially throughout the length of said one member, and means for directing fluid through said perforations and between said adjacent walls of the members to keep particulate material from between and to lubricate said adjacent walls throughout the length of the piston member during reciprocation thereof.

21. Pumping apparatus as claimed in claim 20 in which said perforations are in the wall of the piston member, and said directing means is adapted to direct fluid into the piston member.

22. Pumping apparatus as claimed in claim 20 in which said perforations are in the wall of the cylinder member and said directing means is connected to the cylinder member.

References Cited
UNITED STATES PATENTS

| | | | |
|---|---|---|---|
| 1,595,362 | 8/1962 | Schaefer | 302—36 |
| 1,960,435 | 5/1934 | Dudley | 302—36 |
| 1,483,143 | 2/1924 | Whitlock | 103—204 |
| 2,667,280 | 1/1954 | Lane | 214—17.4 |
| 3,266,435 | 8/1966 | Smith | 103—204 |

ANDRES H. NIELSEN, Primary Examiner

U.S. Cl. X.R.

302—36